United States Patent [19]

Jackson et al.

[11] 4,103,577
[45] Aug. 1, 1978

[54] SHEARS

[75] Inventors: John Charles Jackson; Percy Bruce Gordon Selous, both of Sheffield, England

[73] Assignee: Ashlow Steel & Engineering Company Limited, Sheffield, England

[21] Appl. No.: 765,388

[22] Filed: Feb. 3, 1977

[30] Foreign Application Priority Data

Feb. 17, 1976 [GB] United Kingdom ............... 6107/76

[51] Int. Cl.² .................... B26D 3/22; B23D 25/12
[52] U.S. Cl. .................................. 83/337; 83/338
[58] Field of Search .............................. 83/337, 338

[56] References Cited

U.S. PATENT DOCUMENTS 2,451,948  10/1948  Hawthorne ........................ 83/338
4,027,565  6/1977  Elsner et al. ...................... 83/337

FOREIGN PATENT DOCUMENTS 1,402,427  11/1968  Fed. Rep. of Germany ......... 83/337
207,664    1968    U.S.S.R. .............................. 83/337

Primary Examiner—Donald R. Schran
Attorney, Agent, or Firm—Lowe, King, Price & Markva

[57] ABSTRACT

A shearing device for cutting rod of the type comprising a pair of coplanar discs with projecting blades has the blades mounted in grooves in the discs so that the tips of the blades can be moved into and out of the path of the rod, thereby enabling the discs to rotate continuously and thus avoiding the problem with the known shearing device of accelerating and stopping the discs and ensuring that the blades are moving at precisely the same speed as the rod during the cutting action.

4 Claims, 9 Drawing Figures

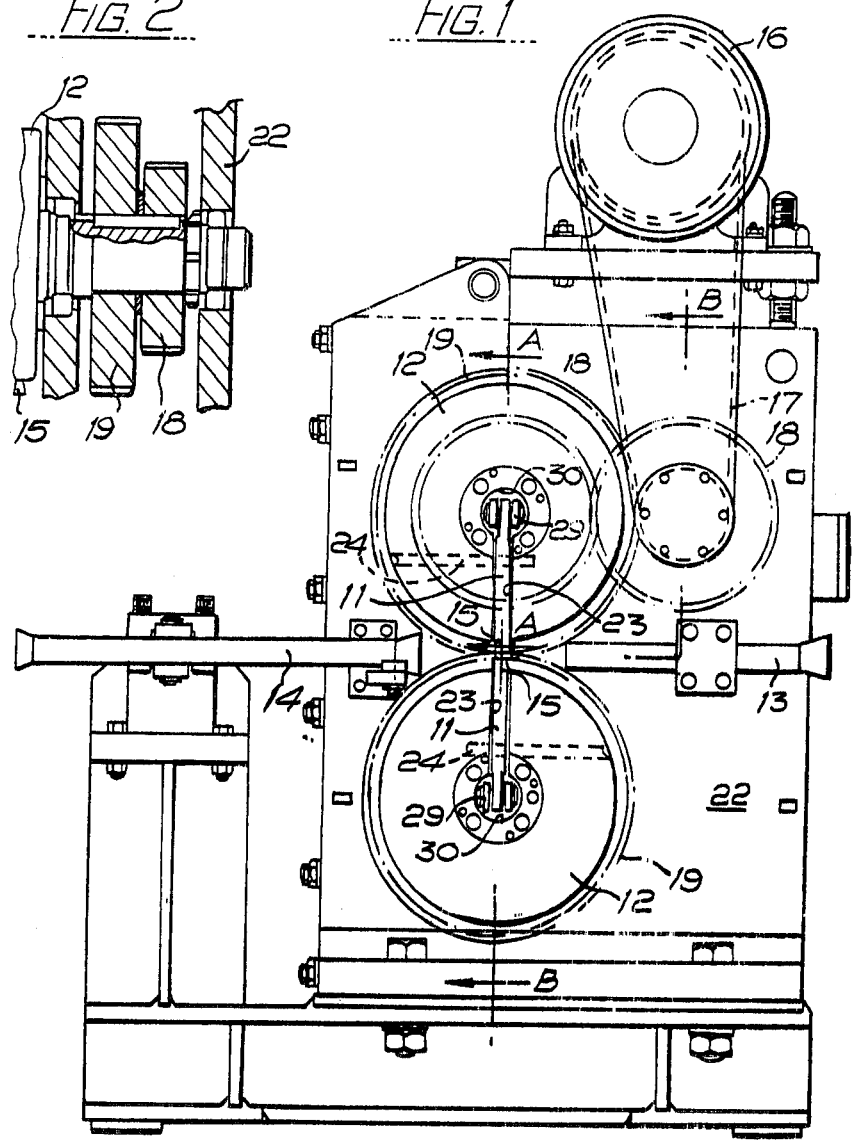

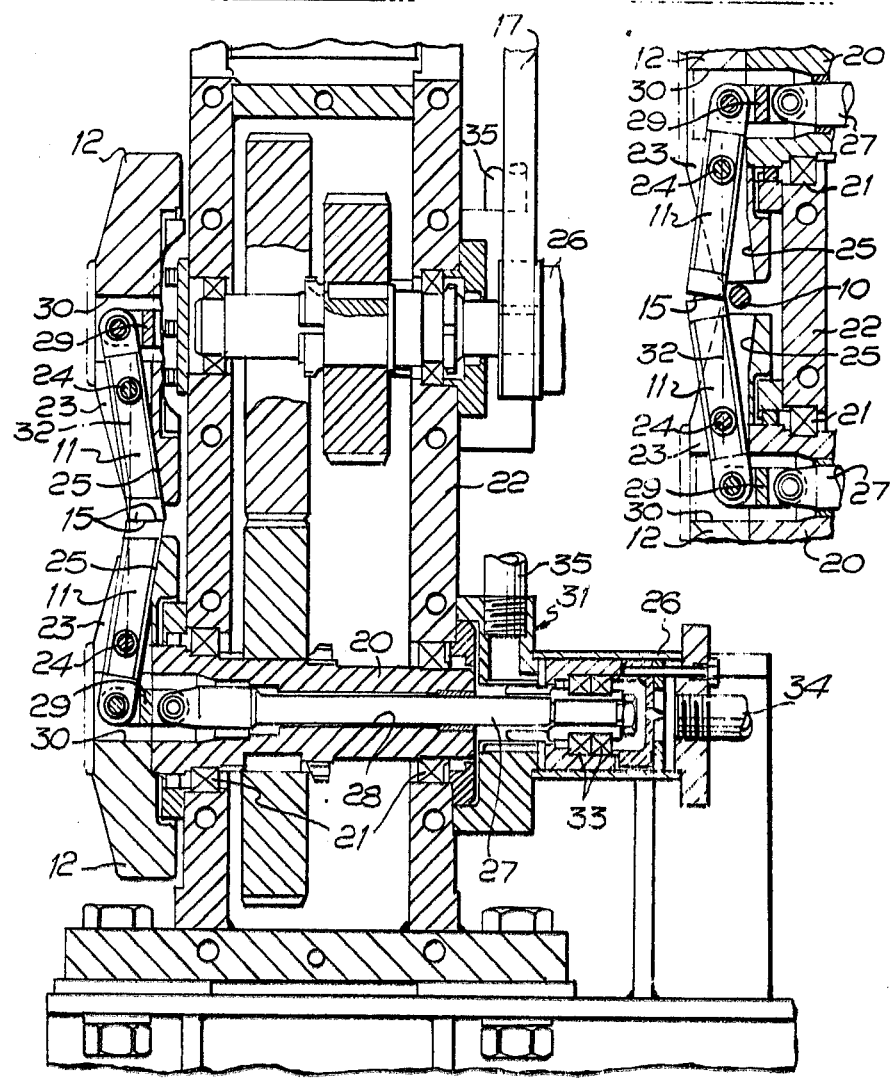

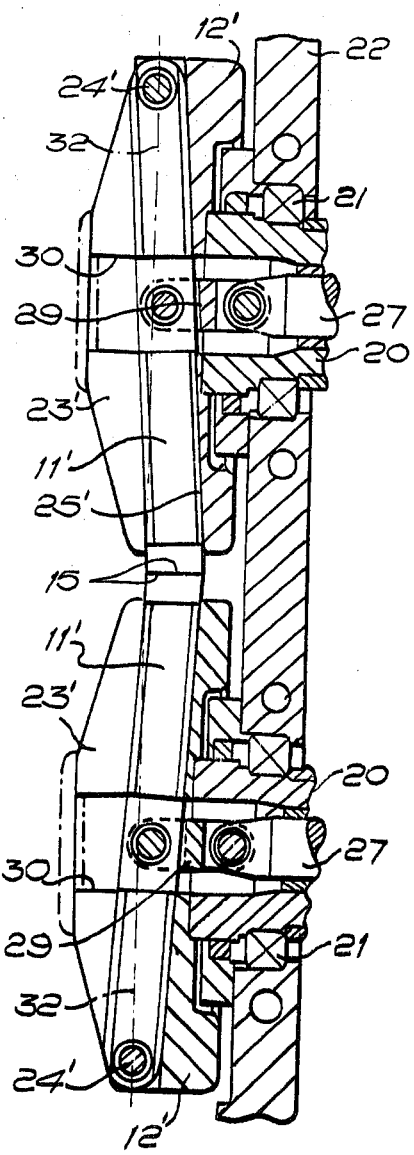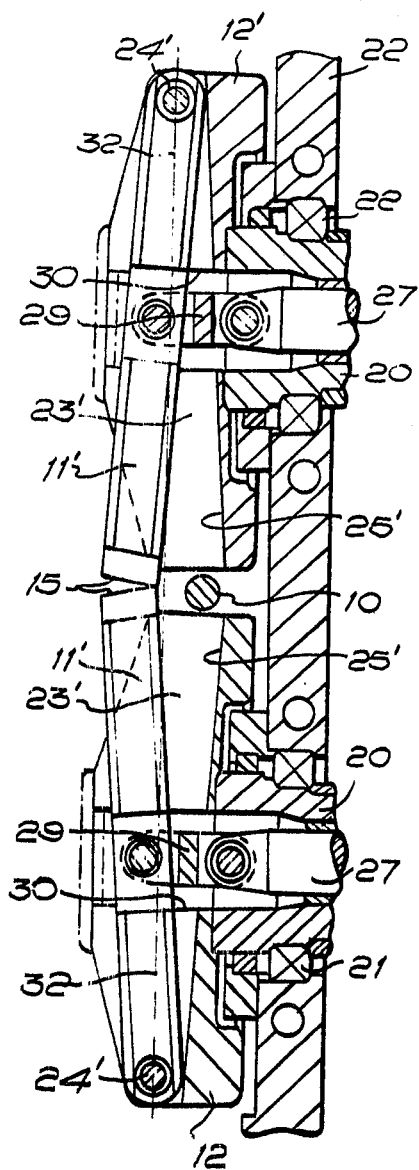

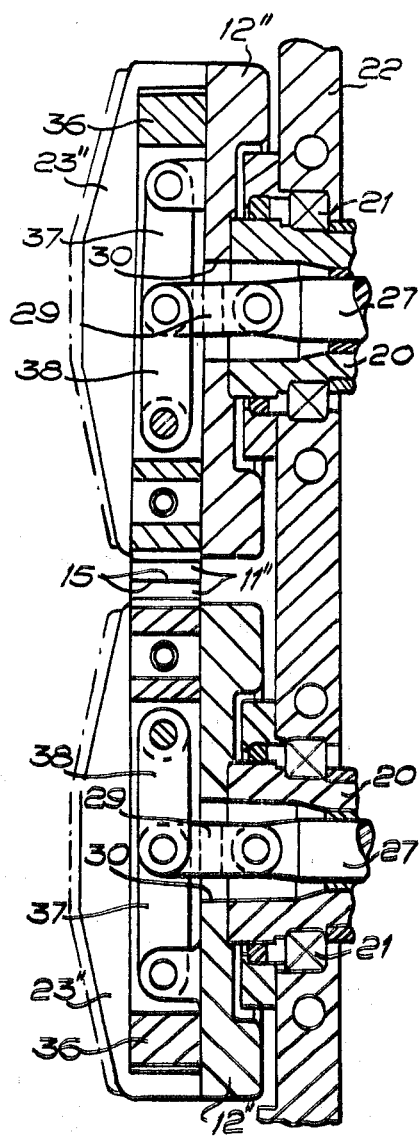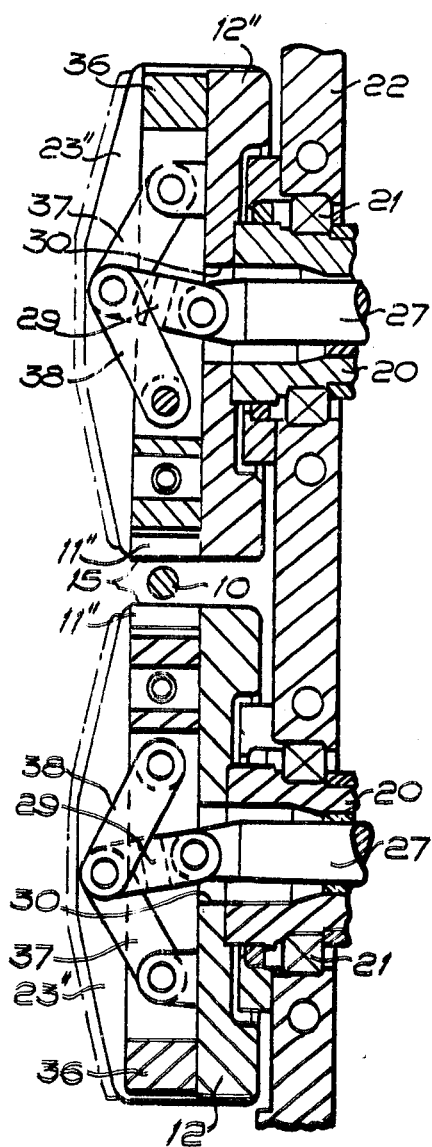

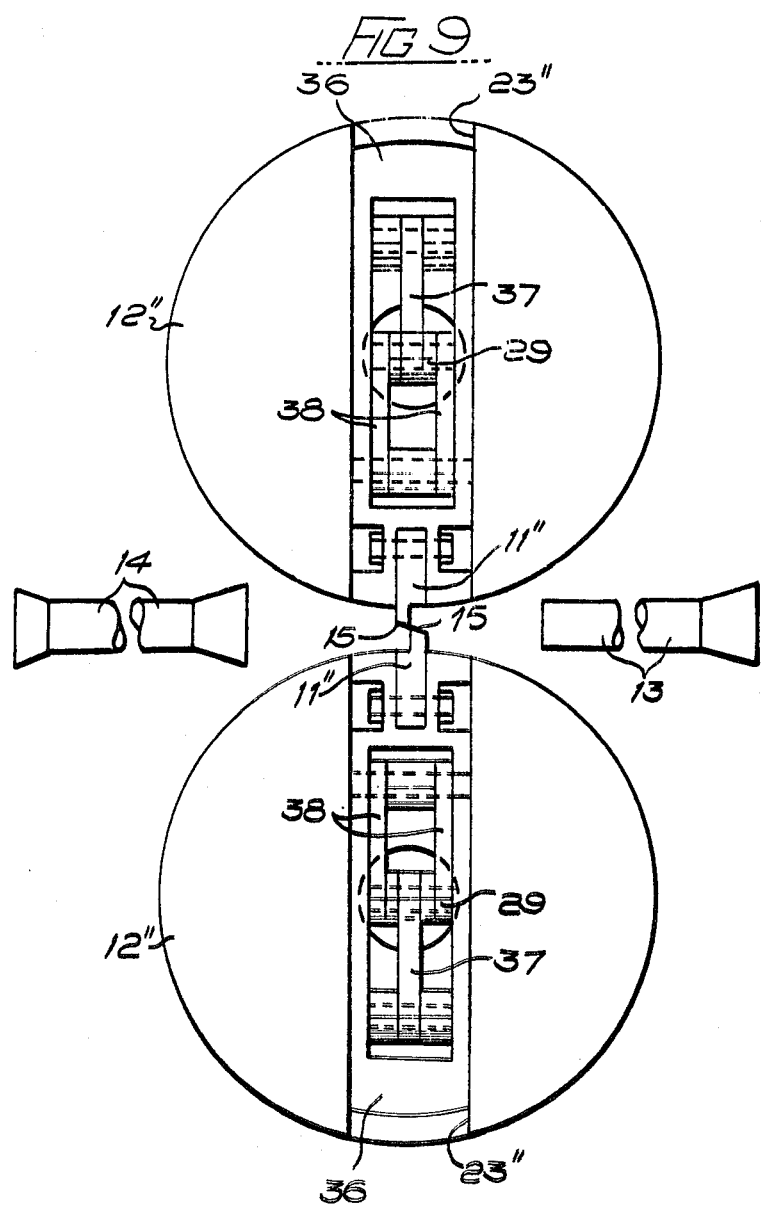

SHEARS

This invention relates to shears more particularly for cutting rod (or bar) moving at high speed, and has for its object the provision of a shearing device capable of cutting rod moving at high speed without disturbing the rod sideways (i.e., perpendicular to the direction of motion), which disturbance causes a wavelike instability to propagate back down the rod and resulting in distortion known as a "cobble".

It is known to employ shearing devices in which a pair of blades project one from each of a pair of coplanar discs between which the rod passes and which are normally, at rest and must be accelerated to cause the blades to come together to effect cutting and then must be stopped. With rod moving at high speed it is extremely difficult, if not impossible to ensure that the blades are moving at precisely the same speed as the rod during the cutting action.

According to the present invention, a shearing device for cutting rod comprises a pair of blades projecting one from each of a pair of coplanar discs between which the rod is adapted to pass, means for rotating the discs continuously such that at the positions of closest approach of the blades to the path of the rod the tips of the blades move in the direction of motion of the rod and with exactly the same linear speed as the rod, each blade being movable in a groove in its disc between an operative position in which the path of the tip of the blade will intersect with the path of the rod and an inoperative position in which the path of the tip of the blade will pass clear of the path of the rod, and means for moving the blades between the aforesaid positions.

The blades are normally held in their inoperative positions, so that the discs can rotate continuously without causing cutting of the rod. Thus no accelerating and stopping of the discs is necessary, and so the momentum of each disc can be utilised in the manner of a flywheel to maintain the linear speed of the tips of the blades precisely the same as that of the rod. When it is required to cut the rod the blades are moved to their operative positions, and after coming together to cut the rod the blades can be moved within less than the next revolution to their inoperative positions. Thus the bar can be cut at intervals equal to the circumference of the path of the tip of each blade, or a multiple thereof, and the discs and/or the blades may be interchangeable with discs and/or blades affording a different interval of cut by having a different circumference of path of the tips of the blades.

To remove the front end of a length of rod, the blade can be in its operative position at this end passes between the discs, and remain in this position until the required number of chopping cuts have been made, after which the blade is moved into its inoperative position in less than one revolution. As the rear end of the rod approaches the shear, the blade can be moved back into its operative position and maintained there in order to cut off and chop up the required length of rod at the rear end. Alternatively, a separate chopping shear or scrap shear can be used to chop up the ends.

The blades may move radially in their grooves between their two positions as aforesaid, but whereas centrifugal force may assist in moving the blades to their operative positions, movement of the blades back to their inoperative positions (or vice versa) will be against the centrifugal force, and, therefore, may be more difficult unless they are mounted in slides with counterbalance weights on the opposite side of the axis of rotation. Thus the blades preferably move perpendicularly to the planes of the discs, i.e., the blades move towards and away from the bottoms of the grooves in the discs as the blades move between their two positions as aforesaid, and preferably each blade is pivoted in its groove to move to either side of a plane perpendicular to the axis of rotation of its disc, so that centrifugal force will always be urging the blade away from either of its two positions as aforesaid and, therefore, will assist the means for moving the blades between the aforesaid positions. Each pivot may be located between the tips of its blade and the axis of rotation of the respective disc, or the axis of rotation of the disc may lie between the tip of the blade and its pivot.

The means for moving the blades preferably consists of double-acting air cylinders, but any other device capable of moving the blades from their inoperative positions to their operative positions and/or vice versa within a very small space of time, e.g. 10 milliseconds, will suffice.

Conveniently, the means for moving each blade is connected to the blade by a rod passing through an axial bore in a shaft carrying the disc and a link in an axial bore in the disc communicating with the groove in the disc.

Three embodiments of the invention will now be described, by way of example only, with reference to the accompanying drawings, in which FIG. 1 is an elevation of a shearing device for cutting rod;

FIG. 2 is a fragmentary section on the line A — A of FIG. 1;

FIG. 3 is an enlarged section generally from the line B — B of FIG. 1, with the device in operative conditions;

FIG. 4 is a fragmentary section corresponding to a part of FIG. 3 but showing the inoperative condition;

FIGS. 5 and 6 are fragmentary sections corresponding to FIGS. 3 and 4 but relating to an alternative device;

FIGS. 7 and 8 are similar Figures relating to yet another device; and

FIG. 9 is a fragmentary elevation of the left-hand side of FIG. 7.

In FIGS. 1 to 4, a shearing device for cutting rod 10 (FIG. 4 only) comprises a pair of blades 11 projecting one from each of a pair of coplanar discs 12 between which the rod is adapted to pass by means of a feed tube 13, a run out guide tube 14, also being provided. The discs are adapted to rotate continuously in such a manner that at the positions of closest approach of the blades (i.e., as shown in FIGS. 1, 3 and 4) to the path of the rod the tips 15 of the blades move in the direction of motion of the rod and with exactly the same linear speed as the rod, the rotating being effected by means of a motor 16, a belt drive 17, a first pair of meshing gears 18, and a second pair of meshing gears 19, the latter being on hollow shafts 20 carrying the discs and rotatable in bearings 21 in a frame 22 on top of which is mounted the motor 16. Each blade 11 is movable in a groove 23 in its disc 12 between an operative position (FIG. 3) in which the path of the tip 15 of the blade will intersect with the path of the rod 10 and an inoperative position (FIG. 4) in which the path of the tip of the blade will pass clear of the path of the rod.

Each blade 11 is mounted on a pivot 24 located between the tip 15 of its blade and the axis of rotation of the respective disc 12 and moves perpendicularly to the plane of its disc, i.e., the blades move towards and away from the bottoms 25 of the grooves in the discs as the blades move between their two positions as aforesaid. Means for moving each blade 11 consists of a double-acting air cylinder 26 connected to the blade by a piston rod 27 passing through an axial bore 28 in the shaft 20 and a link 29 in an axial bore 30 in the disc 12 communicating with the groove 23 in the disc, and the stroke of the piston 31 is such that the blade moves to either side of a plane 32 perpendicular to the axis of rotation of its disc, so that centrifugal force will always be urging the blade from either of its two positions as aforesaid and, therefore, will assist the double-acting air cylinder 26 to move the blades between the aforesaid positions. Each piston rod 27 is mounted in bearings 33 in the piston 31 so that the rod can rotate with the shaft 20 without the piston having to rotate as well, Movement of each blade 11 from inoperative position (FIG. 4) to operative position (FIG. 3) is effected by admitting compressed air to the cylinder 26 through a pipe 34, and reverse movement of each blade is effected by admitting compressed air to the cylinder through a pipe 35.

The blades 11 are normally held in their inoperative positions (FIG. 4), so that the discs 12 can rotate continuously without causing cutting of the rod 10. Thus no accelerating and stopping of the discs is necessary, and so the momentum of each disc can be utilised in the manner of a flywheel to maintain the linear speed of the tips 15 of the blades 11 precisely the same as that of the rod, which may be of the order of 80 metres/sec. When it is required to cut the rod 10 the blades 11 are moved to their operative positions (FIG. 3), and after coming together (as shown in FIGS. 1 and 3) to cut the rod the blades can be moved within less than the next revolution to their inoperative positions (FIG. 4). Thus the rod 10 can be cut at intervals equal to the circumference of the path of the tip 15 of each blade, or a multiple thereof. An interlock (not shown) is preferably provided to ensure that the blades 11 cannot be moved from their inoperative positions to their operative positions, and vice versa, whilst they are travelling through adjacent arcs of movement around the position of closest approach of their tips 15, lest they displace the rod 10 sideways and cause jamming and probable serious damage.

In FIGS. 5 and 6 like reference numerals are used for like parts in FIGS. 3 and 4 and prime (') reference numerals are used to designate parts which differ in structure. The axis of rotation of each disc 12' now lies between the tip 15 of the blade 11' and its pivot 24', and so movement of each blade from inoperative position (FIG. 6) to operative position (FIG. 5) is effected by opposite movement of the piston rod 27 to that in the embodiment of FIGS. 3 and 4, i.e., by admitting compressed air to the cylinder 26 (FIG. 3) through the pipe 35 instead of the pipe 34, and vice versa to move each blade from operative position (FIG. 5) to inoperative position (FIG. 6).

In FIGS. 7 to 9, like reference numerals are again used for like parts in FIGS. 3 and 4 and FIGS. 5 and 6, and double prime (") reference numerals are used to designate parts which differ in structure. The blades 11" are mounted in slides 36 movable along the grooves 23", and the links 29 connect the piston rods 27 to sets of toggle links 37, 38 which when moved to in-line positions (FIGS. 7 and 9) move the blades radially outwards to their operative positions; or when the toggle links 37, 38 are moved out of line (FIG. 8) the slides 36 are moved to move the blades radial inwards to their inoperative positions. The movements of the piston rod 27 correspond to those for the embodiment of FIGS. 5 and 6. The portions of the slides 36 remote from the blades 11' serve as counterbalance weights so that centrifugal forces acting on the blades and slides do not make difficult movement of the blades, back to their inoperative positions. Alternatively, with the counterbalance weights omitted, centrifugal force could be utilised to drive the blades through the rod, the blades normally being held in their inoperative positions by catches (not shown) adapted to be released by means of the piston rod 27, and cams (not shown) being provided to return the blades for engagement by the catches within the next revolution. Further cams (also not shown) could also be provided to assist centrifugal force, upon release of the catches, in driving the blades through the rod.

What we claim is:

1. A shearing device for cutting rod comprising a pair of blades projecting one from each of a pair of coplanar discs between which the rod is adapted to pass, means for rotating the discs continuously such that at the positions of closest approach of the blades to the path of the rod the tips of the blades move in the direction of motion of the rod and with exactly the same linear speed as the rod, each blade being pivotally mounted in a groove in its disc to move to either side of a plane perpendicular to the axis of rotation of its disc between an operative position on one side of said plane in which the path of the tip of the blade will intersect with the path of the rod and an inoperative position on the opposite side of said plane in which the path of the tip of the blade will pass clear of the path of the rod, and a pair of double-acting air cylinders for moving the blades between the aforesaid positions.

2. A shearing device as in claim 1, wherein each pivot is located between the tip of its blade and the axis of rotation of the respective disc.

3. A shearing device as in claim 1, wherein the axis of rotation of each disc lies between the tip of the blade and its pivot.

4. A shearing device as in claim 1, wherein each double-acting air cylinder is connected to its blade by a rod passing through an axial bore in a shaft carrying the disc and a link in an axial bore in the disc communicating with the groove in the disc.

* * * * *